(12) United States Patent
Eto

(10) Patent No.: US 7,339,751 B2
(45) Date of Patent: Mar. 4, 2008

(54) LENS BARREL AND PHOTOGRAPHING APPARATUS

(75) Inventor: Akihiro Eto, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 11/176,646

(22) Filed: Jul. 8, 2005

(65) Prior Publication Data

US 2006/0007565 A1    Jan. 12, 2006

(30) Foreign Application Priority Data

Jul. 9, 2004    (JP)    ............... 2004-202736

(51) Int. Cl.
*G02B 15/14*    (2006.01)
(52) U.S. Cl. ............... 359/704; 359/703; 359/822
(58) Field of Classification Search ........... 359/704
See application file for complete search history.

(56) References Cited

U.S. PATENT DOCUMENTS

| | | | | |
|---|---|---|---|---|
| 6,795,252 B2 * | 9/2004 | Koiwai et al. | ............... | 359/704 |
| 2002/0135903 A1 * | 9/2002 | Nomura et al. | ............... | 359/823 |
| 2004/0160683 A1 * | 8/2004 | Nomura et al. | ............... | 359/819 |
| 2005/0068638 A1 | 3/2005 | Katsuhiko et al. | | |

FOREIGN PATENT DOCUMENTS

| | | |
|---|---|---|
| JP | 9-15476 | 1/1997 |
| JP | 2003-121912 | 4/2003 |
| JP | 2003-270509 | 9/2003 |
| JP | 2004-54027 | 2/2004 |
| JP | 2004-109708 | 4/2004 |
| JP | 2004-117466 | 4/2004 |
| JP | 2004-120015 | 4/2004 |
| JP | 2004-247969 | 9/2004 |
| JP | 2004-274515 | 9/2004 |
| JP | 2004-279684 | 10/2004 |
| JP | 2004-364418 | 12/2004 |
| JP | 2005-92140 | 4/2005 |

* cited by examiner

*Primary Examiner*—Jessica T Stultz
(74) *Attorney, Agent, or Firm*—Oblon, Spivak, McClelland, Maier & Neustadt, P.C.

(57) ABSTRACT

A lens barrel includes a straight-moving cylinder including a lens group therein, being movable in a direction of an optical axis of the lens group without being rotated, and having a depression on a posterior end portion of the straight-moving cylinder; a guide pin protruding from the outer circumferential surface of the straight-moving cylinder; a rotational-moving cylinder movable in the direction of the optical axis, having a cam groove for engaging with the guide pin); and a reinforcement pin projecting from the inner circumferential surface of the rotational-moving cylinder; wherein the depression includes a contact surface separated from a side portion of the reinforcement pin with a predetermined clearance.

6 Claims, 9 Drawing Sheets

FIG.3B  FIG.3A  FIG.3C
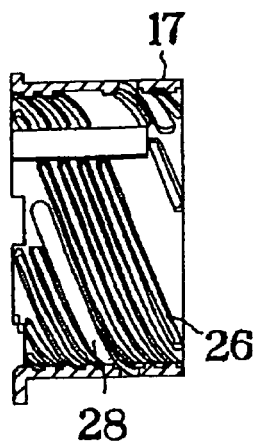
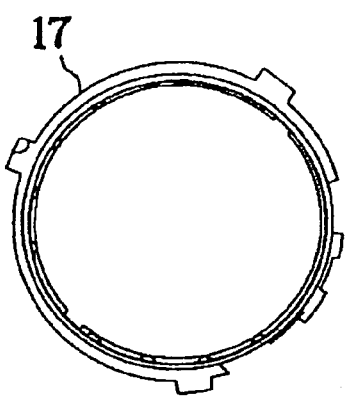
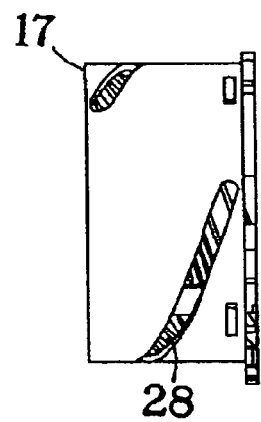
FIG.3D
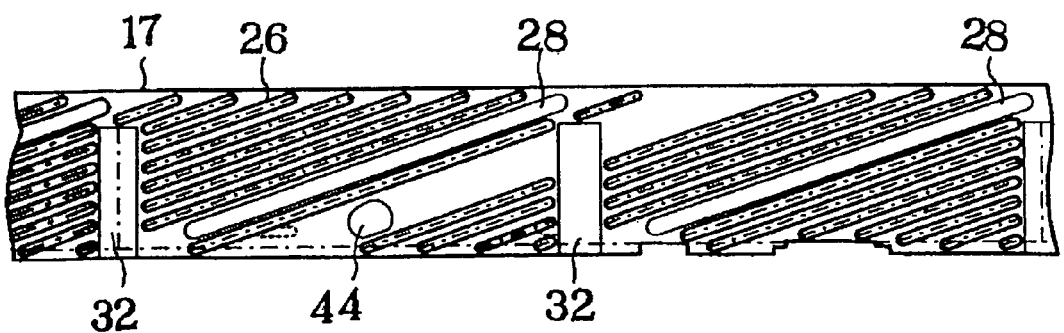

LENS BARREL AND PHOTOGRAPHING APPARATUS

BACKGROUND OF THE INVENTION

1. Field of the Invention

The present invention relates to a lens barrel having a magnification-varying function and a photographing apparatus including the same. Particularly, the invention relates to an improvement in the strength of the lens barrel or the photographing apparatus.

2. Description of Related Art

For varying the magnification of a lens barrel having a magnification-varying function by moving a plurality of lens groups thereof, there is employed a lens barrel including in combination a plurality of rotation cylinders which rotate along the optical axis and a plurality of straight-moving cylinders which move straight along the axis, wherein the positions of the plurality of lens groups are varied by protruding/retracting the barrel electrically or manually.

For example, in a lens barrel of Japanese patent laid-open No. 2004-54027 as partially shown in a sectional view of FIG. 11, a straight-moving cylinder 52 and a rotation cylinder 53 are prevented from rattling by the following construction. That is, a tip portion of an outer circumference of a straight moving cylinder 52 is provided with taper guiding pins 54 each having a tapered guiding surface and parallel guiding pins 55 each having parallel guide faces in section, and an inner circumferential surface of the rotation cylinder 53 is provided with spiral cam grooves with which the taper guiding pins 54 and the parallel guiding pins 55 are engaged, whereby the straight moving cylinder 52 can be moved forward and backward by way of rotating the rotation cylinder 53.

In the barrel, if external force is applied to the straight-moving cylinder 52 from the optical axis direction, it may be that the applied external force causes the tapered guiding surfaces of the taper guiding pins 54 to move in a radial direction of the lens barrel while sliding along slant side surfaces of the cam grooves, and the taper guiding pins 54 and the parallel guiding pins 55 are disengaged from the cam grooves, rendering the lens barrel inoperative. For preventing such inoperativeness, springs 56 are disposed on sides opposite to the tapered guiding surfaces of the taper guiding pin 54, so that disengagement of the parallel guiding pins 55 from the cam grooves can be avoided by moving only the taper guiding pins 54 in the radial direction of the barrel when external force is applied from the optical axis direction to the straight-moving cylinder 52.

As described above, although springs 56 are disposed on the opposite side to the tapered guiding surfaces of the taper guiding pins 54 so that only the taper guiding pins 54 may be moved in the radial direction of the barrel when external force is applied to the straight-moving cylinder 52 in the optical axis direction, the taper guiding pins 54 and the parallel guiding pins 55 may be disengaged from the cam grooves if more than a certain amount of external force or external force is applied in another direction rather than the optical axis direction.

SUMMARY OF THE INVENTION

The present invention has been made to alleviate such disadvantages, and one object of the invention is to provide a lens barrel and a photographing apparatus including the same lens barrel capable of stably photographing by surely preventing a tapered guiding surface of a taper guiding pin employed in a straight-moving cylinder from being disengaged from a cam groove even when external force is applied to the straight-moving cylinder having objective lenses.

One aspect of the present invention is that a lens barrel comprises a straight-moving cylinder including therein a lens group located on an anterior portion thereof, being movable in a direction of an optical axis of the lens group without being rotated, and having a depression on a posterior end portion of the straight-moving cylinder; at least one guide pin located on an outer circumferential surface of the straight-moving cylinder, while protruding from the outer circumferential surface of the straight-moving cylinder; a rotational-moving cylinder located around an outer circumference of the straight-moving cylinder, being movable in the direction of the optical axis, having a cam groove located in an inner circumferential surface thereof for engaging with the at least one guide pin, and configured for moving in the direction of the optical axis under rotation; and a reinforcement pin projecting from the inner circumferential surface of the rotational-moving cylinder; wherein the depression includes a contact surface separated from a side portion of the reinforcement pin with a predetermined clearance.

Another aspect of the present invention is that a photographing apparatus comprises said lens barrel.

The present application claims the benefit of priority to Japanese Patent Application No. 2004-202736, filed on Jul. 9, 2004, the contents of which are incorporated herein by reference.

BRIEF DESCRIPTION OF THE DRAWINGS

For a better understanding of the invention, reference is made to the attached drawings, wherein:

FIG. 3A is a front view of a first straight-moving cylinder.

FIG. 3B is a sectional view of the first straight-moving cylinder.

FIG. 3C is a side view of the first straight-moving cylinder.

FIG. 3D is a development view of the first straight-moving cylinder showing an interior thereof.

DETAILED DESCRIPTION OF THE PREFERRED EMBODIMENTS

A First Embodiment of the Present Invention

Figure 1:
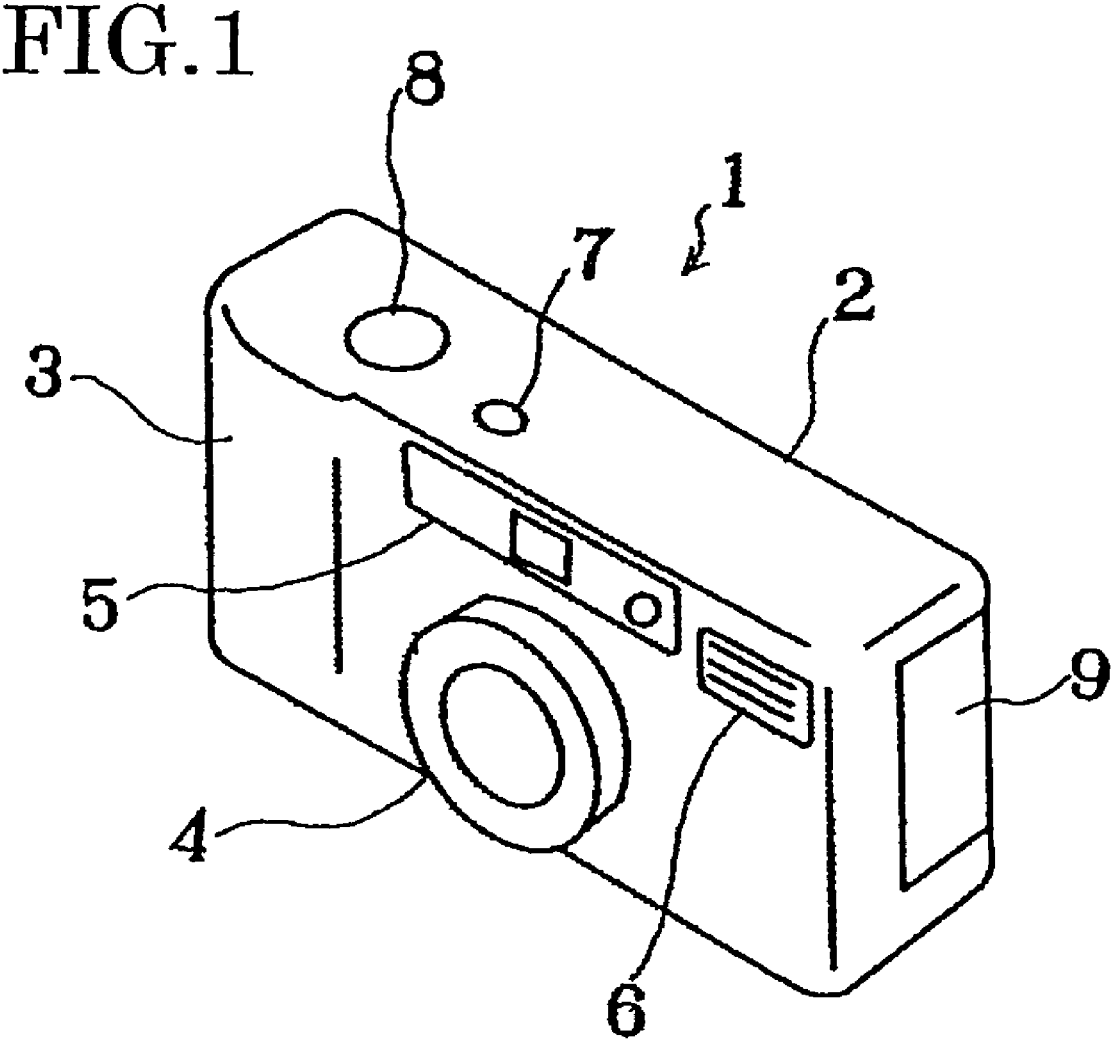
FIG. 1 is a perspective view showing an exterior of a digital camera according to the present invention.

FIG. 1 is a perspective view showing an exterior of a digital camera according to the present invention. As shown in FIG. 1, a digital camera 1 is provided with a grip 3 and a lens barrel 4 having photographing lens groups therein. As viewed from a front side, the grip 3 is located in the left side of a body 2 of the digital camera 1 and the lens barrel 4 is in a central portion of the body 2. Above the lens barrel 4 are arranged an optical finder 5 for a user to visually check an area to be photographed, etc. and a flash unit 6 for emitting supplemental light on photographing under a low illumination intensity condition. A power switch 7 and a shutter button 8 are arranged on a top face of the body 2. Further, a slot portion 9 capable of holding a memory card is provided on a right side in the front view.

Figure 2:
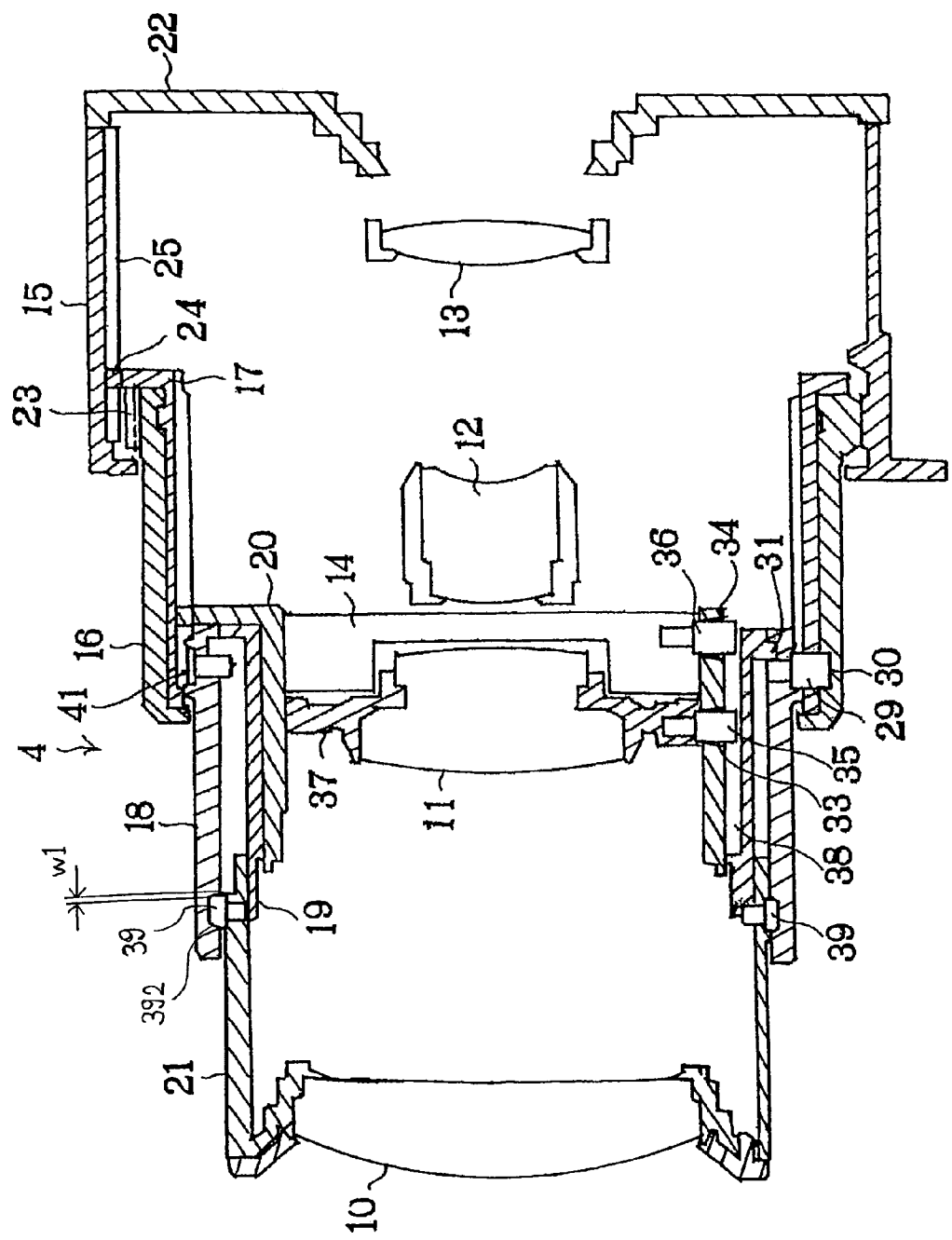
FIG. 2 is a sectional view showing a lens barrel in a protruded state for telephotographing.

The lens barrel 4 has a magnification-varying function. As illustrated in the sectional view of FIG. 2 showing a protruded state for telephotographing, the lens barrel includes therein a first lens group 10, a second lens group 11, a third lens group 12, a fourth lens group 13 and a shutter unit 14. Since the third lens group 12 and the fourth lens group 13 are controlled independently from the remainder, a driving part for driving the first lens group 10, the second lens group 11 and the shutter unit 14 of the lens barrel 4 will be described below.

The driving part for driving the first lens group 10, the second lens group 11 and the shutter unit 14 includes a holding frame 15, a first rotation cylinder 16 movably/slidably disposed around an inner circumference of the holding frame 15, a first straight-moving cylinder 17 disposed on an inner circumference of the first rotation cylinder 16, a second rotation cylinder 18 movably/slidably disposed around an inner circumference of the first straight-moving cylinder 17, a second straight-moving cylinder 19 movably/slidably disposed around an inner circumference of the second rotation cylinder 18, a cam cylinder 20 for holding the second lens group 11 and the shutter unit 14, and a straight-moving cylinder 21 for holding the first lens group 10 disposed between the second rotation cylinder 18 and the second straight-moving cylinder 19. One end portion of the holding frame 15 is fixed to a base 22 and the inner circumference surface of the holding frame 15 and an outer circumference surface of the first rotation cylinder 16 are helicoidally engaged with each other. A gear portion 23 connected to a zoom motor (not shown) via a group of gears is disposed on the outer circumferential end of the first rotation cylinder 16, and the first rotation cylinder 16 moves in the optical axis direction under rotation because of its helicoid engagement with the holding frame 15 and rotating power of the zoom motor. Helicoid grooves are formed into a polygonal-line shape for helicoidally engaging the holding frame 15 with the first rotation cylinder 16. After the first rotation cylinder 16 is protruded for a predetermined length, the first rotation cylinder 16 only rotates without moving in the optical axis direction like a parallel cam does.

The first rotation cylinder 16 is rotatable relative to the first straight-moving cylinder 17, and is attached to the first straight-moving cylinder 17 to move together therewith in the optical axis direction. A straight-moving key 24 is formed on an edge of the first straight-moving cylinder 17, and is engaged with a straight-moving key groove 25 formed in the inner circumferential portion of the holding frame 15.

Figure 4:
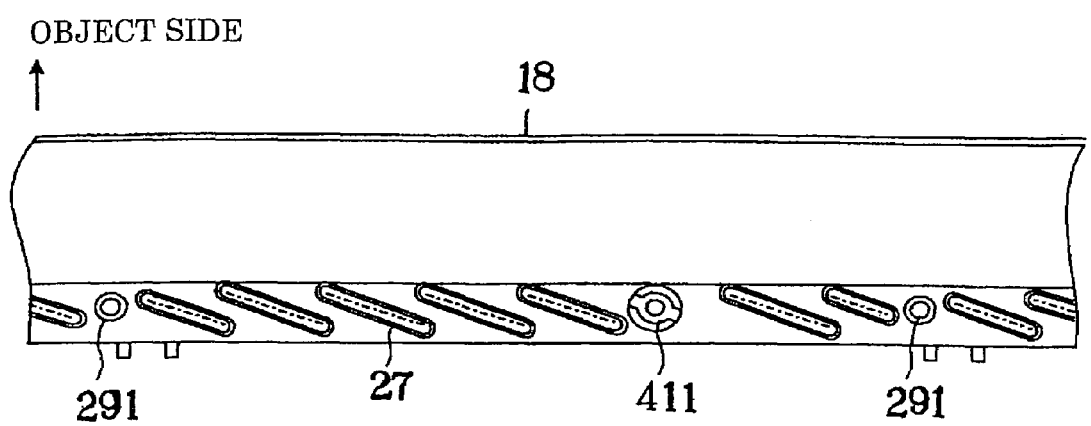
FIG. 4 is a development view of a second rotation cylinder showing an exterior thereof.
Figure 5:
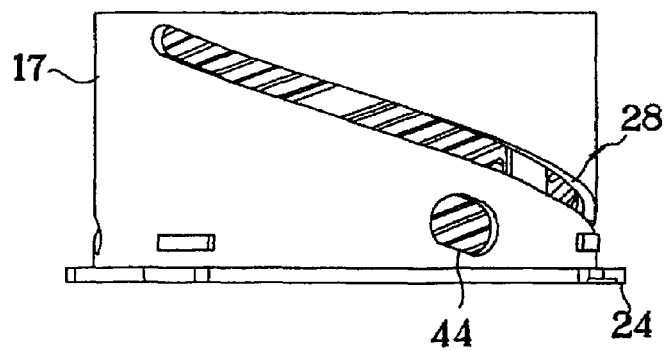
FIG. 5 is an external view of the first straight-moving cylinder.

The first straight-moving cylinder 17 moves together with the first rotation cylinder 16 in the optical axis direction and performs a rectilinear movement without rotating. As shown in the front view of FIG. 3A, the side sectional view of FIG. 3B, the side view of FIG. 3C and the development view of FIG. 3D showing the inner circumferential surface, female helicoidal screws 26 are formed in the inner circumferential surface of the first straight-moving cylinder 17. As shown in a development view of FIG. 4 showing the outer circumferential surface, male helicoidal screws 27 are formed on an outer circumferential surface of the second rotation cylinder 18 to engage with the female helicoidal screws 26, thereby the first straight-moving cylinder 17 and the second rotation cylinder 18 are helicoidally engaged with each other. Straight cam grooves 28 are formed in the first straight-moving cylinder 17, as shown in FIG. 3 and FIG. 5. Rotation-transmitting shafts 29 are provided in transmitting-shaft attachment portions 291 of the second rotation cylinder 18, respectively, and are engaged with straight cam grooves 30 formed in the inner circumferential surface of the first rotation cylinder 16 via cam grooves 28 of the straight cylinder 17. Thereby, rotating force of the first rotation cylinder 16 is transmitted to the second rotation cylinder 18 via the rotation-transmitting shafts 29, so that the second rotation cylinder 18 is rotated in the same rotation amount as that of the first rotation cylinder 16. The second rotation cylinder 18 having the helicoidal engagement with the first straight-moving cylinder 17 is moved in the optical axis direction under rotation by the rotating force applied to the second rotation cylinder 18.

The second rotation cylinder 18 is rotatable relative to the second straight-moving cylinder 19 and is attached to the second straight-moving cylinder 19 to move together therewith in the optical axis direction. The direct advance keys 31 is formed on the second straight-moving cylinder 19, and is engaged with direct advance guide portions 32 formed on the inner circumferential portion of the first straight-moving cylinder 17. The second straight-moving cylinder 19, which moves together with the second rotation cylinder 18 in the optical axis direction, performs a rectilinear movement without rotating. The second rotation cylinder 18 and the cam cylinder 20 are engaged with each other through a rib/groove fashion, thereby the rotating force of the second rotation cylinder 18 is directly transmitted to the cam cylinder 20. Also, the cam cylinder 20, which is rotatable relative to the second straight-moving cylinder 19, is attached to the second straight-moving cylinder 19 to move together in the optical axis direction. Second group cam sockets 33 and shutter cam sockets 34 are formed in the cam cylinder 20 so that a frame 37 of the second lens group 11 and the shutter unit 14 may be held by second group guide pins 35 and shutter guide pins 36 respectively. Direct advance grooves 38 with which the second group guide pins 35 and the shutter guide pins 36 are engaged are formed in an inner circumferential surface of the second straight-moving cylinder 19, thereby the second lens group 11 and the shutter unit 14 move in the optical axis direction without rotating.

Figure 6:
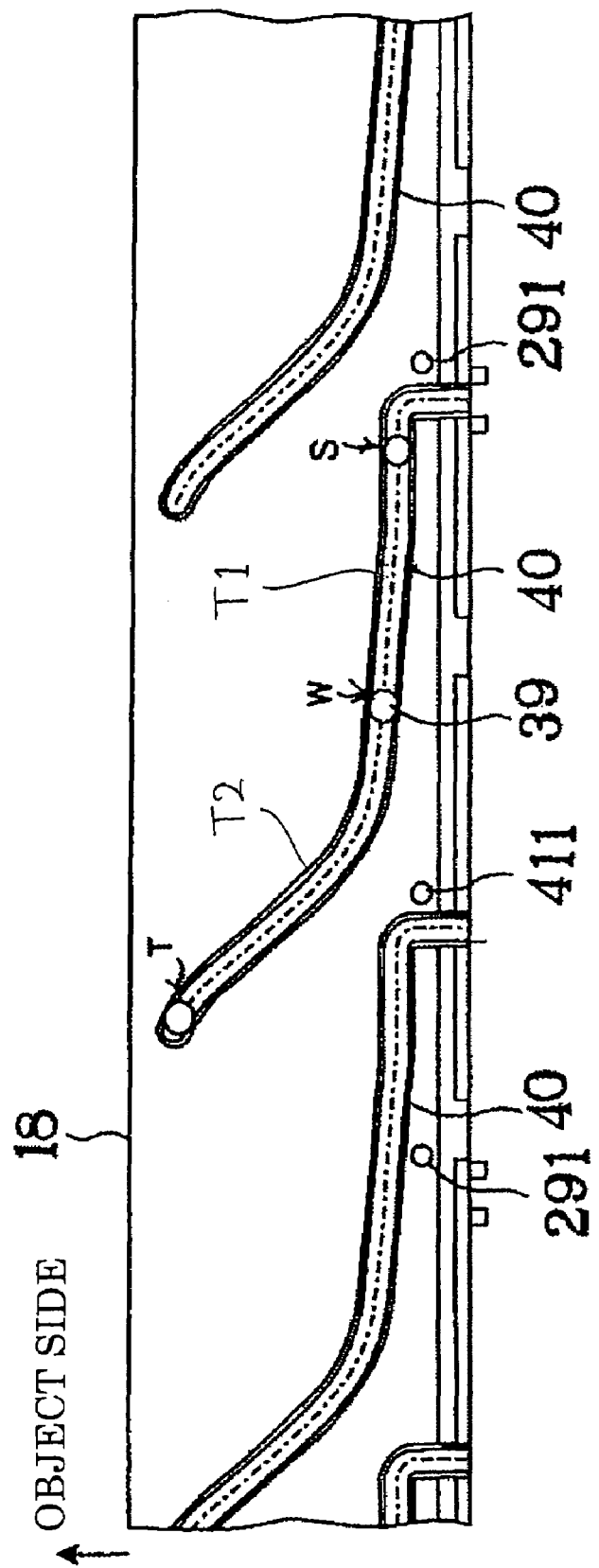
FIG. 6 is a development view the second rotation cylinder showing an interior thereof.

The straight-moving cylinder 21 includes a plurality of tapered guide pins 39 each includes a tapered guide surface 392 having a width "w1" on a top portion thereof and located on an end portion opposite to the position in which the first lens group 10 is held. As shown in the development view of FIG. 6 showing the inner circumferential surface of the second rotation cylinder 18, the tapered guide pins 39 are engaged with first group cam grooves 40 formed in the inner circumferential surface of the second rotation cylinder 18.

An inner circumferential surface of the straight-moving cylinder 21 and an outer circumferential surface of the second straight-moving cylinder 19 are engaged with each other in such an engaging manner as allows only straight movement, thereby the straight-moving cylinder 21 moves straight in the optical axis direction without rotating. Each of the cam grooves 40 formed in the second rotation cylinder 18 is constituted by a first track portion "T1" and a second track portion "T2", the first track portion "T1" having a low inclination angle which gives rise to a small displacement toward an object side when the lens barrel 4 is shifted from a stored state "S" to a wide-state "W", and the second track portion "T2" having a high inclination angle which gives rise to a large displacement toward the object side when the lens barrel is shifted from the wide-state "W" to a state "T" for telephotographing. Thus, when the lens barrel 4 is shifted from the stored state "S" to a wide-state "W", the travel distance of the straight-moving cylinder 21 is short in the optical axis direction, whereas when the lens barrel 4 is shifted from the wide-state "W" to the state "T" for telephotographing, the straight-moving cylinder 21 moves largely in the optical axis direction under rotation of the second rotation cylinder 18.

Figure 7:
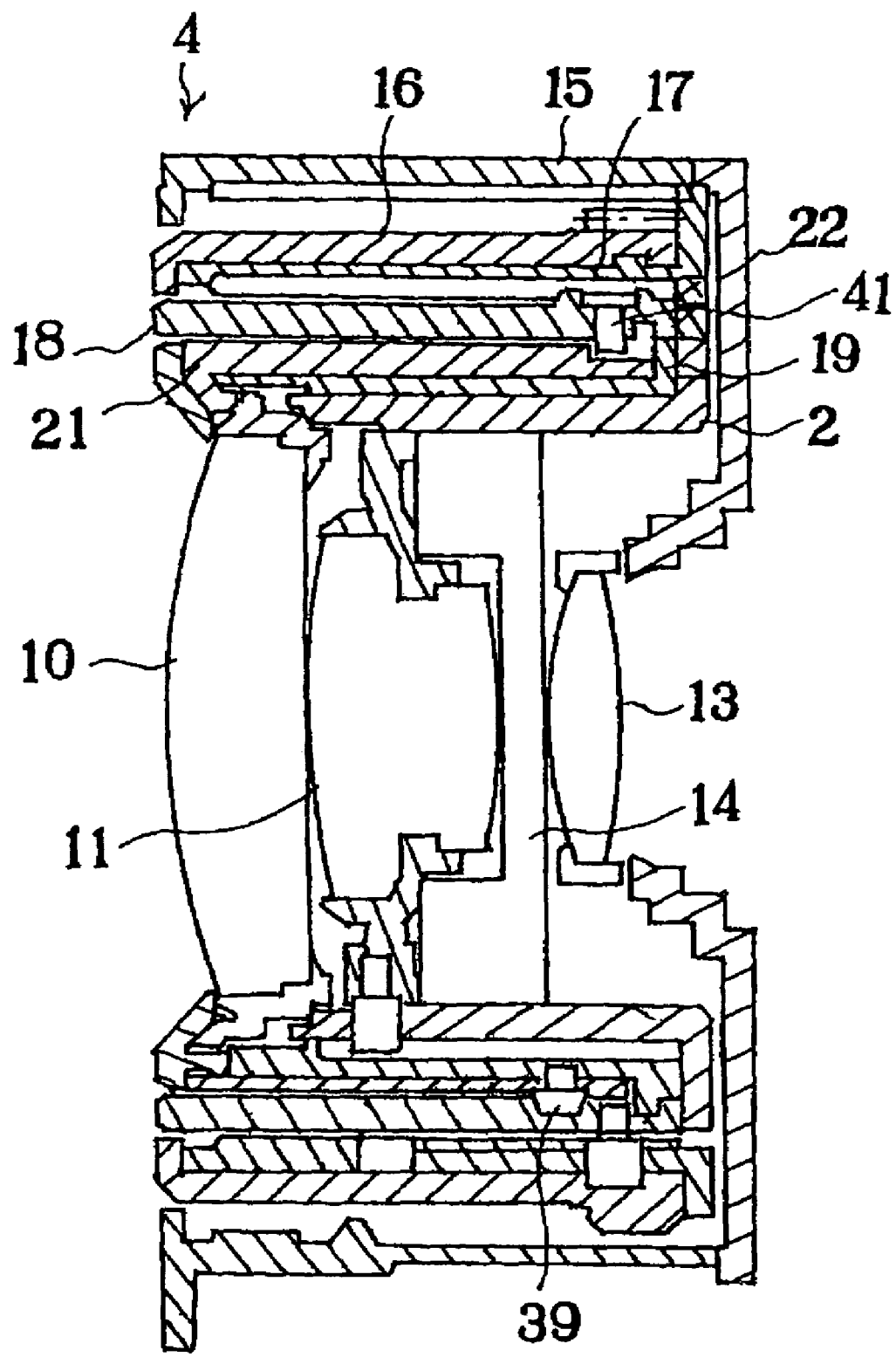
FIG. 7 is a sectional view showing the lens barrel in a stored state.

When the lens barrel 4 is retracted, as shown in the sectional view of FIG. 7, the first rotation cylinder 16, the first straight-moving cylinder 17, the second rotation cylinder 18, the second straight-moving cylinder 19, the cam cylinder 20 and the straight-moving cylinder 21 are stored within the frame 15. If this state is switched to the wide-state by driving the zoom motor to rotate the first rotation cylinder 16, as shown in the sectional view of FIG. 8, then the first rotation cylinder 16 and the first straight-moving cylinder 17 move relative to the fixed frame 15 in the optical axis direction by a predetermined distance. At that time, the second rotation cylinder 18, the second straight-moving cylinder 19, the cam cylinder 20 and the straight-moving cylinder 21 move altogether by a predetermined distance, thereby shifting the first lens group 10 and the second lens group 11 to the wide-state. If the first rotation cylinder 16 is further rotated by driving the zoom motor, then the second rotation cylinder 18, the second straight-moving cylinder 19 and the cam cylinder 20 are moved forward along the first straight-moving cylinder 17 by rotating force of the first rotation cylinder 16, and the straight-moving cylinder 21 is moved forward by rotating force of the straight-moving cylinder 21, thereby shifting the first lens group 10 and the second lens group 11 to the state for telephotographing, as shown in FIG. 2. When the lens barrel 4 is protruded to the telephotographing state from the stored state, as shown in the diagram of FIG. 9 showing characteristics of changes in travel distance, the travel distances of the first lens group 10 and the second lens group 11 are short when shifted from the stored state to the wide-state, and are long when shifted from the wide-state to the state for telephotographing.

If a load caused by external force is applied to the top of the lens barrel 4 in such a state that the lens barrel 4 is protruded, then the contact between the tapered guide pins 39 and the first group cam grooves 40 becomes a linear contact which renders the connecting strength therebetween weaker than that of a helicoidal engagement having a planar contact. Because the holding frame 15 is helicoidally engaged with the first rotation cylinder 16, the first straight-moving cylinder 17 is helicoidally engaged with the second rotation cylinder 18, and the second rotation cylinder 18 and the straight-moving cylinder 21 are engaged with each other using the tapered guide pins 39 and the first group cam grooves 40.

As for the tapered guide pins 39 and the first group cam grooves 40, when the lens barrel 4 is protruded to be in the wide-state from the stored state, a pressure angle of the tapered guide pins 39 for the first group cam grooves 40 is low because the tapered guide pins 39 moves very little with respect to the first group cam grooves 40. On the other hand when the lens barrel 4 is protruded to be in the state for telephotographing from the wide-state, a pressure angle of the tapered guide pins 39 for the first group cam grooves 40 is high because the moving distance of the tapered guide pins 39 with respect to the first group cam grooves 40 is long. By using flat gears and the like for gear connection between the zoom motor and the first rotation cylinder 16, if a load is applied to the top of the lens barrel 4 under a high pressure angle condition, because the second rotation cylinder 18 and the first rotation cylinder 16 rotate, the applied external force is divided into a component force for rotation and another component force applied to the engaging portion between the tapered guide pins 39 and the first group cam grooves 40, rendering the force applied to the engaging portion between the tapered guide pins 39 and the first group cam grooves 40 smaller. On the other hand since applied external force is not divided into rotation force under the condition where the pressure angle of the tapered guide pins 39 for the first group cam grooves 40 is low, force applied to the engaging portion between the tapered guide pins 39 and the first group cam grooves 40 is great, rendering the mechanical strength of the connection between the second rotation cylinder 18 and the straight-moving cylinder 21 weakest when the lens barrel 4 is shifted from the stored state to the wide-state or is in the wide-state.

Figure 8:
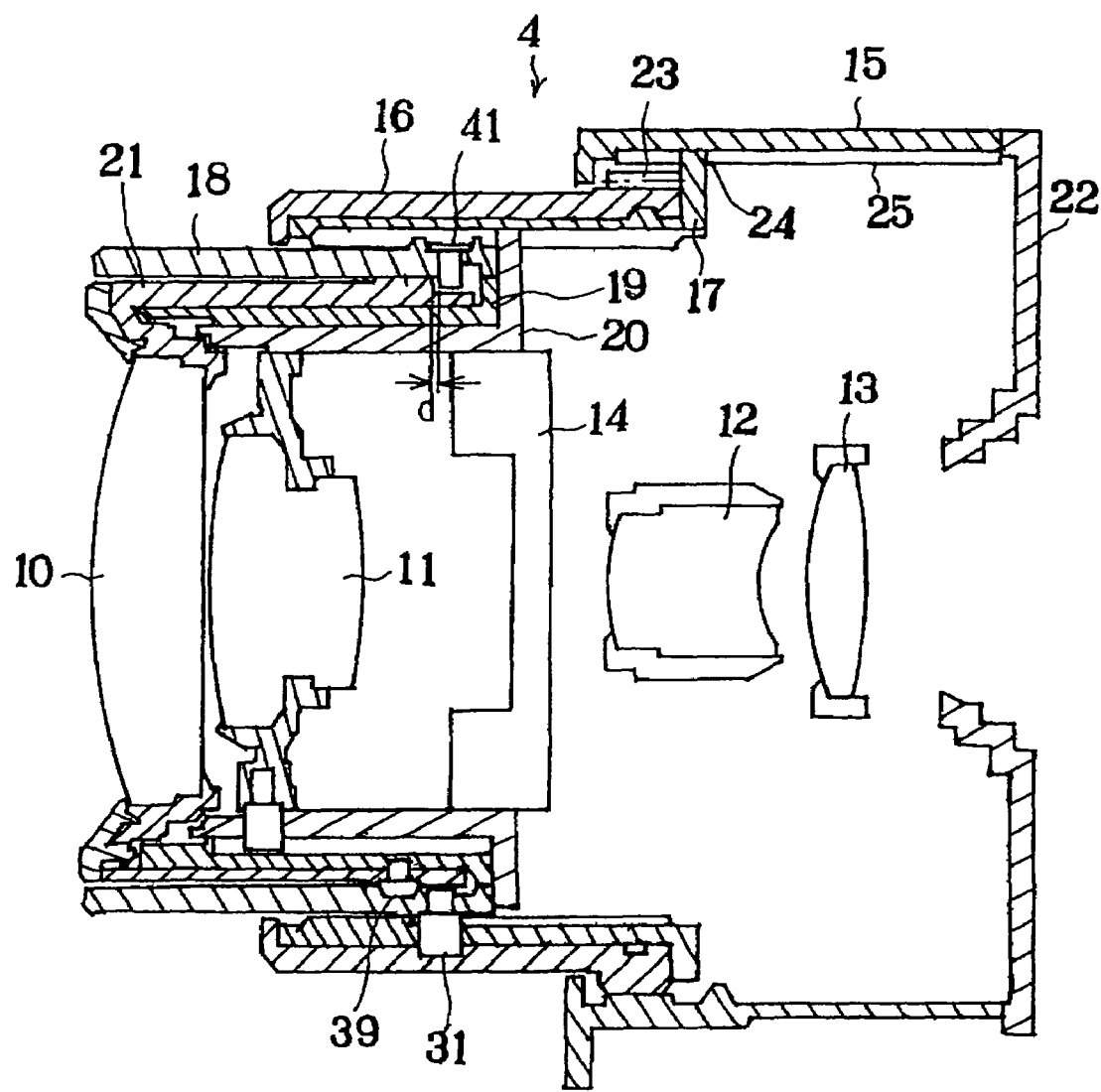
FIG. 8 is a sectional view showing the lens barrel in a wide state.
Figure 9:
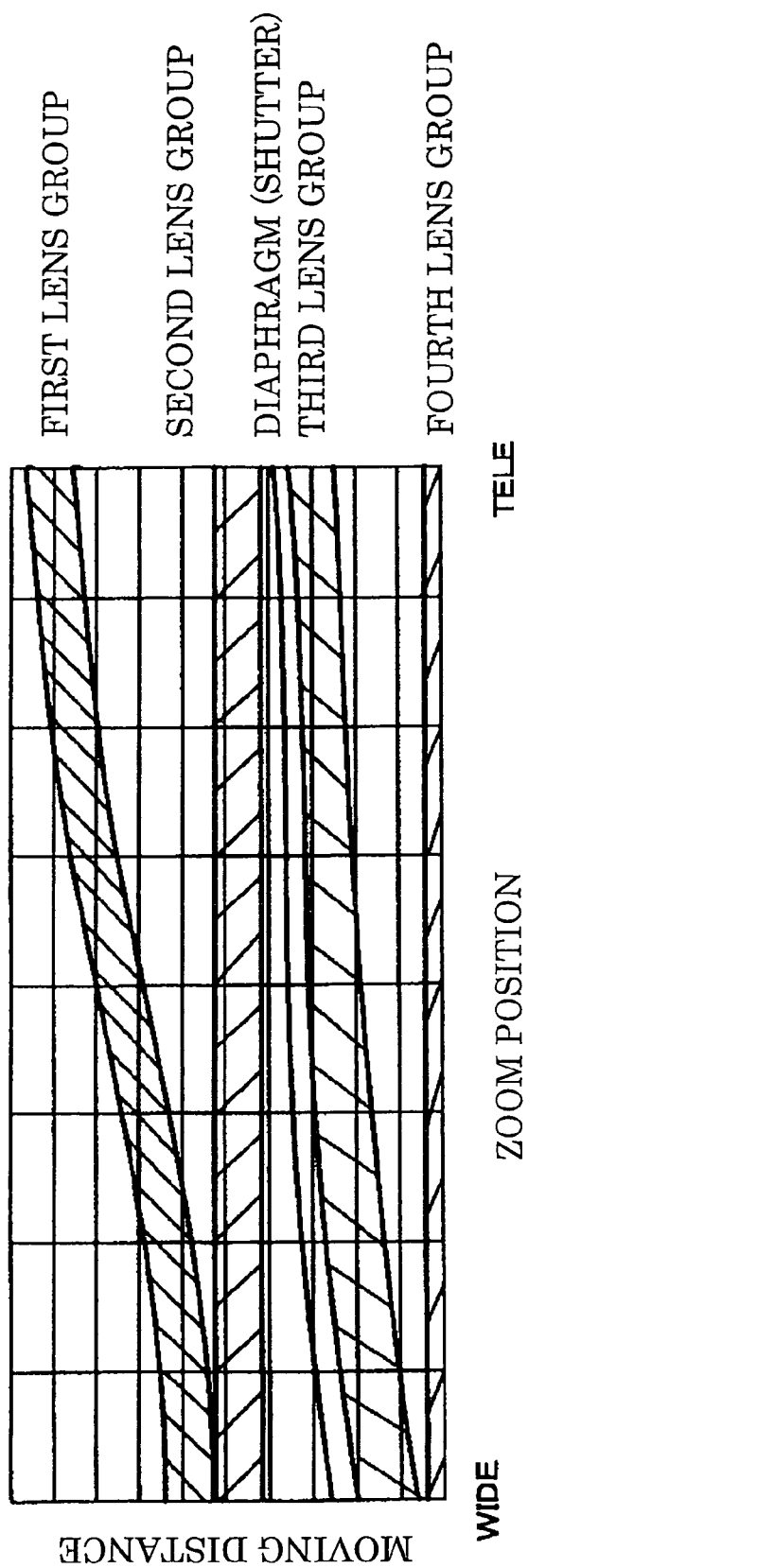
FIG. 9 is an explanatory diagram showing characteristics of changes in the travel distance of lens groups and a shutter unit relative to a zoom position.
Figure 10:
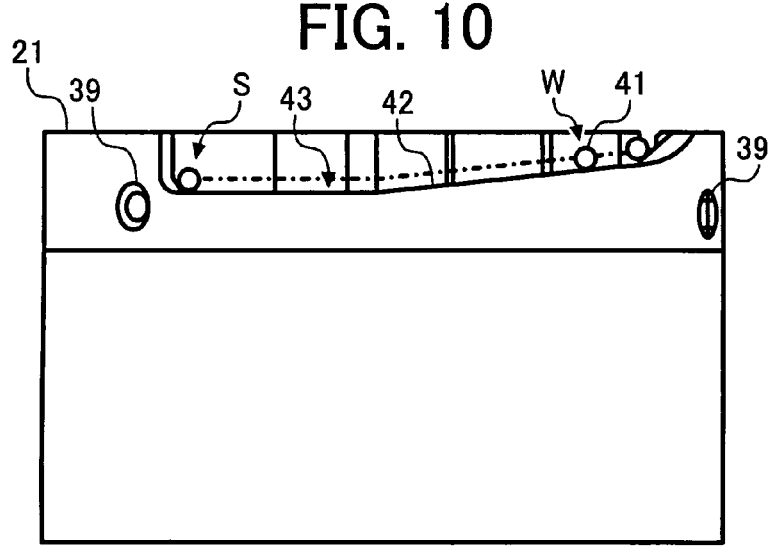
FIG. 10 is an external view showing a configuration of a contact surface of a straight-moving cylinder which contacts to a reinforcement pin.
Figure 11:
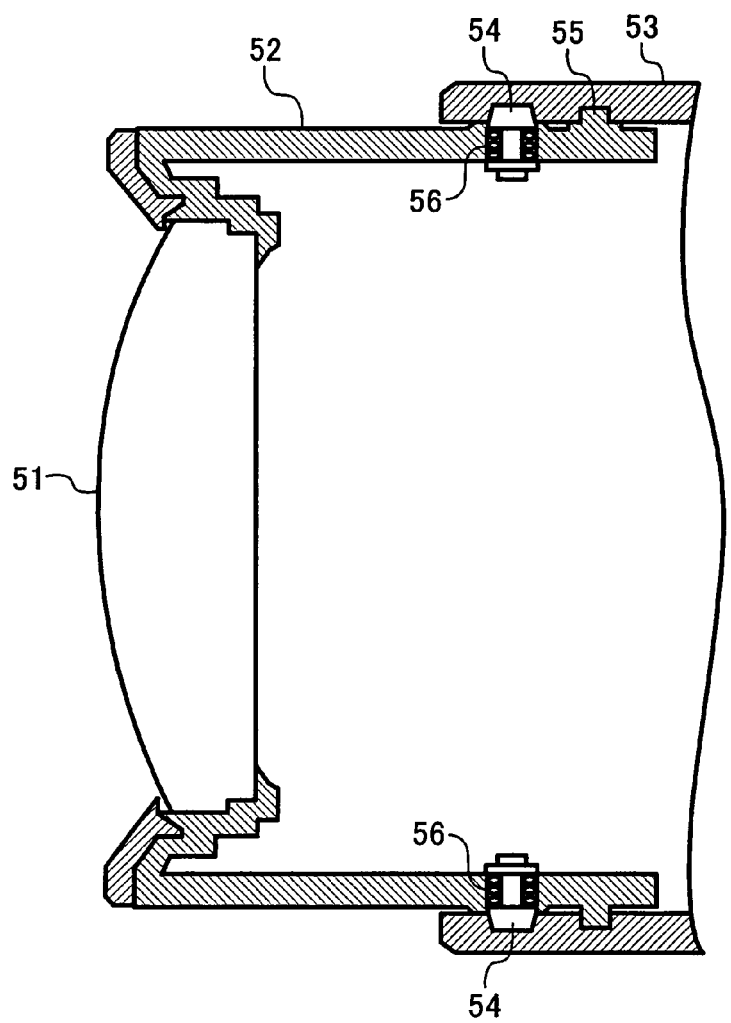
FIG. 11 is a partly sectional view showing a structure of a example of a conventional barrel.

Thus, as shown in FIG. 8, a reinforcement pin 41 is attached to the second rotation cylinder 18, at an end portion on a side opposite to the first lens group 10, from an external circumferential surface side of the second rotation cylinder 18, while a predetermined length of the reinforcement pin 41 is projected from an inner circumferential surface thereof. Further, as shown in FIG. 10, a depression portion 43 having a contact surface 42 for contacting a side portion of the reinforcement pin 41 is formed in a posterior end of the straight-moving cylinder 21. In FIGS. 4 and 6, a reference numeral 411 designates a mounting portion of the reinforcement pin 41. The projecting length of the reinforcement pin 41 from the inner circumferential surface of the second rotation cylinder 18 is determined so that the top end of the reinforcement pin 41 may not contact the second straight-moving cylinder 19 but the projecting portion of the reinforcement pin 41 may contact the contact surface 42 of the straight-moving cylinder 21. If the reinforcement pin 41 contacts to the contact surface 42 of the straight-moving cylinder 21 while the lens barrel 4 is protruding or is retracting, a defective operation may occur. Thus, the reinforcement pin 41 is located in a position where a predetermined clearance "d" is kept between the reinforcement pin 41 and the contact surface 42 of the straight-moving cylinder 21 so that the contact surface 42 of the straight-moving cylinder 21 may not contact the reinforcement pin 41 in a normal operation but the contact surface 42 of the straight-moving cylinder 21 may contact the reinforcement pin 41 only when the tapered guide pin 39 is disengaging from the first group cam groove 40 because of an load such as an impact applied to the straight-moving cylinder 21, preventing disengagement of the tapered guide pin 39 by the reinforcement pin 41's contact to the contact surface 42 of the straight-moving cylinder 21. Further, a relative position between the second rotation cylinder 18 and the straight-moving cylinder 21 varies according to a zoom position when the lens barrel 4 is being shifted from the stored state to the wide-state. Thus, as shown in FIG. 10, in order to keep the clearance "d" between the reinforcement pin 41 and the contact surface 42 of the straight-moving cylinder 21 constant while the lens barrel 4 is being shifted from the stored state to the wide-state, the depression portion 43 of the straight-moving cylinder 21 is formed so that the track of the contact surface 42 of the straight-moving cylinder 21 may be the same as the first track "T1" portion of the first group cam groove 40 formed on the second rotation cylinder 18, which is used while the lens barrel is being shifted from the stored state "S" to the wide-state "W". In addition, in order to accomplish easy attachment of the reinforcement pin 41 to the second rotation cylinder 18, as shown in FIG. 5, the first straight-moving cylinder 17 is formed with a cavity 44 in which the reinforcement pin 41 is to be inserted.

Thus, since the reinforcement pin 41 is employed in the second rotation cylinder 18, a load applied to the top end portion of the lens barrel 4 is dispersed not only to the tapered guide pin 39 but to the reinforcement pin 41 when the lens barrel 4 is in the wide-state or is on a way of shifting from the stored state to the wide-state where a pressure angle of the tapered guide pin 39 for the first group cam groove 40 is low. Therefore, the mechanical strength of the lens barrel 4 may be enhanced when the barrel is in the wide-state or is on the way of shifting from the stored state to the wide-state, so that reliable photographing may be carried out with the digital camera 1.

As described above, according to the lens barrel of the present invention, the guide pin which is located on the outer circumferential surface of the straight-moving cylinder having the lens group on the top portion thereof is engaged with the cam groove, the reinforcement pin is projected from the inner circumferential surface of the rotational-moving cylinder for moving the straight-moving cylinder in the optical direction under rotation thereof, and the rear end of the straight-moving cylinder is provided with the depression including the contact surface separate from the side portion of the reinforcement pin by a predetermined clearance. Thus, since the contact surface of the straight-moving cylinder contacts the reinforcement pin when a load is applied to the top end portion of the straight-moving cylinder, the load applied to the top end portion may be dispersed to the guide pin and the reinforcement pin. Consequently, the strength of the connecting portion between the straight-moving cylinder and the rotational-moving cylinder can be enhanced.

Also, the predetermined clearance between the contact surface of the straight-moving cylinder and the reinforcement pin is set so that the contact surface of the straight-moving cylinder may contact the reinforcement pin when a load which exceeds a predetermined level is applied to the straight-moving cylinder. Thus, when the load which exceeds the predetermined level is applied to the top end portion of the straight-moving cylinder, the applied load may be dispersed to the guide pin and the reinforcement pin, preventing the guide pin from disengaging from the cam groove of the rotational-moving cylinder.

Further, the track of the cam groove of the rotational-moving cylinder is constituted by a first track portion and a second track portion, the first track portion having a low inclination angle which gives rise to a small displacement of the rotational-moving cylinder relative to the lens group and provided corresponding to a range from the beginning of a rotation to a predetermined angle of rotation of the rotational-moving cylinder, and the second track portion having a high inclination angle which gives rise to a large displacement of the rotational-moving cylinder relative to the lens group and provided corresponding to another range after the rotational-moving cylinder passes the predetermined angle of rotation. A track of the contact surface of the straight-moving cylinder is formed to be in conformity with the first track portion of the cam groove of the rotational-moving cylinder having the low inclination angle. Thus, when the mechanical strength would be weakest without the applied load being dispersed as the rotating force in the state that the pressure angle of the tapered guide pins for the first group cam grooves is low, the load applied to the top end portion may be dispersed to the guide pin and the reinforcement pin. Consequently, the strength of the connecting portion between the straight-moving cylinder and the rotational-moving cylinder can be enhanced.

Although only the lens barrel 4 employed in the digital camera 1 is described in this description, the lens barrel may be employed in any photographing apparatus such as camera which uses a film, a camcorder, etc. to enhance strength of the photographing apparatus, so that various photographing can be repeatedly made with reliability.

What is claimed is:

1. A lens barrel comprising:
   a straight-moving cylinder including therein a lens group located on an anterior portion thereof, being movable in a direction of an optical axis of the lens group without being rotated, and having a depression on a posterior end portion of the straight-moving cylinder;
   at least one guide pin located on an outer circumferential surface of the straight-moving cylinder, while protruding from the outer circumferential surface of the straight-moving cylinder;
   a rotational-moving cylinder located around an outer circumference of the straight-moving cylinder, being movable in the direction of the optical axis, having a cam groove located in an inner circumferential surface thereof for engaging with the at least one guide pin, and configured for moving in the direction of the optical axis under rotation; and
   a reinforcement pin projecting from the inner circumferential surface of the rotational-moving cylinder,
   wherein the depression includes a contact surface separated from a side portion of the reinforcement pin with a predetermined clearance, said contact surface varying in distance from the posterior end portion of the straight moving cylinder such that the predetermined clearance between the contact surface and the reinforcement pin is maintained when the reinforcement pin moves with respect to the contact surface as the lens barrel moves between stored and wide states.

2. The lens barrel according to claim 1, wherein the at least one guide pin includes a tapered guide surface on a top end thereof and the predetermined clearance is smaller than a width of the tapered guide surface.

3. The lens barrel according to claim 1, wherein the predetermined clearance between the contact surface of the straight-moving cylinder and the reinforcement pin is set so that the contact surface of the straight-moving cylinder can contact to the reinforcement pin when a load which exceeds a predetermined greatness is applied to the straight-moving cylinder.

4. The lens barrel according to claim 1, wherein the cam groove comprises a first track portion and a second track portion, the first track portion having a low inclination angle which gives rise to a small displacement of the rotational-moving cylinder relative to the lens group and provided corresponding to a range from the beginning of a rotation to a predetermined angle of rotation of the rotational-moving cylinder, and the second track portion having a high inclination angle which gives rise to a large displacement of the rotational-moving cylinder relative to the lens group and provided corresponding to another range after the rotational-moving cylinder passes the predetermined angle of rotation, and wherein a track of the contact surface of the straight-moving cylinder is formed to be in conformity with the first track portion of the cam groove of the rotational-moving cylinder having the low inclination angle.

5. A photographing apparatus comprising the lens barrel according to claim 1.

6. The lens barrel according to claim 4, wherein the depression is formed such that the contact surface has a track which is identical to the first track portion of the cam groove.

* * * * *